(12) United States Patent
Kamiunten et al.

(10) Patent No.: US 7,117,736 B2
(45) Date of Patent: Oct. 10, 2006

(54) FLOW SENSOR

(75) Inventors: Shoji Kamiunten, Tokyo (JP);
Yoshiyuki Ishikura, Tokyo (JP);
Shinichi Ike, Tokyo (JP); Seiichiro Kinugasa, Tokyo (JP); Hideyuki Tanaka, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 10/399,350

(22) PCT Filed: Oct. 17, 2001

(86) PCT No.: PCT/JP01/09119

§ 371 (c)(1),
(2), (4) Date: Sep. 25, 2003

(87) PCT Pub. No.: WO02/33362

PCT Pub. Date: Apr. 25, 2002

(65) Prior Publication Data

US 2004/0045352 A1    Mar. 11, 2004

(30) Foreign Application Priority Data

Oct. 17, 2000   (JP)   ............................. 2000-316717

(51) Int. Cl.
*G01F 1/68* (2006.01)
(52) U.S. Cl. .................................. 73/204.15
(58) Field of Classification Search ............. 73/861.95, 73/204.26, 204.21, 204.22, 204.15
See application file for complete search history.

(56) References Cited

U.S. PATENT DOCUMENTS

| | | | |
|---|---|---|---|
| 4,542,650 A * | 9/1985 | Renken et al. ................. 73/196 |
| 4,548,078 A * | 10/1985 | Bohrer et al. ............. 73/204.22 |
| 4,888,988 A * | 12/1989 | Lee et al. ................. 73/204.26 |
| 5,311,775 A | 5/1994 | Suski et al. |
| 5,533,412 A * | 7/1996 | Jerman et al. ........... 73/861.95 |
| 6,035,711 A | 3/2000 | Huijsing et al. |
| 6,079,220 A * | 6/2000 | Buck ........................... 62/212 |
| 6,550,325 B1 * | 4/2003 | Inushima et al. ........ 73/204.26 |

FOREIGN PATENT DOCUMENTS

| | | |
|---|---|---|
| DE | 195 11 687 A1 | 10/1996 |
| JP | 04-240566 | 8/1992 |
| JP | 04-295724 A | 10/1992 |
| JP | 08-145751 | 6/1996 |
| JP | 08-145751 A | 6/1996 |
| JP | 10-068645 | 3/1998 |
| JP | 10-142021 | 5/1998 |
| JP | 2000-018988 | 1/2000 |
| WO | WO 97/21986 | 6/1997 |

* cited by examiner

*Primary Examiner*—Jewel V. Thompson
(74) *Attorney, Agent, or Firm*—Blakely Sokoloff Taylor & Zafman

(57) ABSTRACT

A flow sensor (1) is constituted by a substrate (4) having a front surface (4*a*) side facing a channel (3) for a measurement target fluid (2), and a channel forming member (5) and a plate (6) disposed oppositely across the substrate (4). The substrate (4) is formed of stainless steel having a thickness of about 50 μm to 150 μm into a plate. An electric insulating film is formed on that surface (4*b*) of the substrate (4) which is opposite to the channel (3) side, and a temperature detection sensor (7) for measuring the flow velocity (flow rate) of the fluid (2), an ambient temperature sensor (8), an electrode pad (9), and a thin metal film (10) for wiring are formed on it.

9 Claims, 9 Drawing Sheets

FLOW SENSOR

BACKGROUND ART

The present invention relates to a flow sensor for measuring the flow velocity or flow rate of a fluid flowing in a channel and, more particularly, to a thermal flow sensor.

Two types of flow sensors are known as thermal flow sensors for measuring the flow rate or flow velocity of a fluid. According to the first type, the spatial temperature distribution of a fluid is localized by the flow of heat emitted from a heat-generating body (heater), and the nonuniformity is detected by a temperature sensor (indirect heated type). According to the second type, a change in power or in resistance occurring when the heat of a heat-generating body is deprived of by a fluid is detected, thus detecting a flow velocity or flow rate (self-heating type).

Conventionally, a flow sensor of this type is mainly used for a noncorrosive gas, and recently, one that can be used for liquid or a corrosive gas as well has been developed. For example, a flow rate sensor disclosed in Japanese Patent Laid-Open No. 4-295724 (prior art 1) is known. Also, a thermistor flow velocity sensor and liquid flow rate sensor (prior art 2) disclosed in Japanese Patent Laid-Open No. 8-146026 are known.

In the flow rate sensor described in prior art 1, first, second, and third regions are formed on the first surface of a silicon substrate. A heat-generating body is formed on the first region, and a thermometer constituting portion is formed on the second region. The first and second regions are insulated and separated from each other by a porous silicon region obtained by oxidizing the third region. The second surface on a side opposite to the first surface serves as a surface that receives the flow of the fluid. A silicon cap is fixed to the first surface to increase the rigidity of the silicon substrate, and to protect the heat-generating body and thermometer constituting portion.

In the flow velocity/flow rate sensor described in prior art 2, a heat-generating body and its electrodes are formed on one surface of a plate-like substrate made of alumina, $SiO_2$, or the like. The heat-generating body is covered with an insulator. A thermistor for measuring the temperature of the heat-generating body, and its electrodes are formed on the insulator. The other surface of the substrate is fixed to the inner surface of a cover (container) through an adhesive. Thus, the sensor is completely isolated from the fluid. The cover is made of a metal, e.g., stainless steel (SUS316L), which has good thermal conductivity and good corrosion resistance against a fluid to be measured. Hence, the reliability can be improved more than in the flow rate sensor of prior art 1 described above without causing any problems such as wear and corrosion.

In the flow rate sensor described in prior art 1, however, the silicon substrate is directly exposed to the fluid. Hence, this flow rate sensor cannot be used for a corrosive gas or liquid which is used in a semiconductor manufacturing apparatus and the like.

In the flow velocity/flow rate sensor described in prior art 2, the sensor is fixed to the inner surface of the cover through the adhesive. Accordingly, the heat conduction efficiency between the liquid and the sensor decreases, and the heat capacity of the sensor increases, so that the sensitivity and response speed decrease. Also, the characteristics vary depending on the use amount of the adhesive.

The present invention has been made to solve the conventional problems described above, and has as its object to provide a flow sensor which can cope with almost all corrosive fluids and in which the response characteristics and sensitivity can be improved.

DISCLOSURE OF INVENTION

A flow sensor according to the present invention comprises a thin plate-like substrate which forms part of a channel for a fluid, and temperature detecting means formed on that surface of the substrate which is opposite to the channel and including a heat-generating body. According to this arrangement, the temperature detecting means including the heat-generating body is formed on that surface of the substrate which is opposite to the channel. Hence, the fluid does not come into direct contact with the temperature detecting means, so the sensor can be used for measuring a corrosive gas or liquid depending on the material of the substrate. As the temperature detecting means is not exposed to the fluid, dust will be less deposited on it and it will less deteriorate over time due to the fluid, but maintains a stable performance. As the substrate is a thin plate, heat conduction between the fluid and the temperature detecting means is good.

BEST MODE FOR CARRYING OUT THE INVENTION

The present invention will be described in detail with reference to the drawings.

Figure 1C:
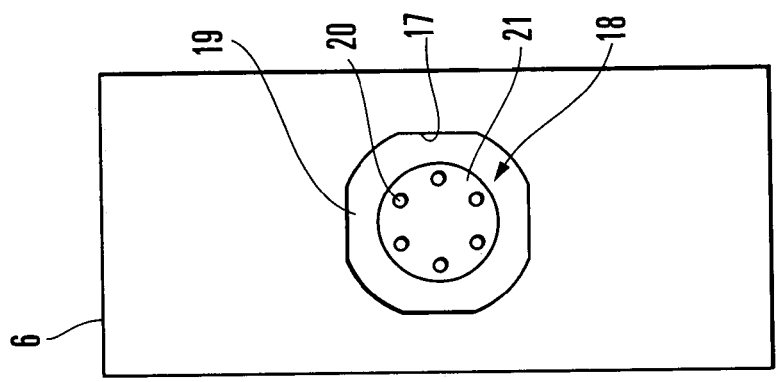
FIGS. 1A, 1B, and 1C are front, sectional, and rear views, respectively, showing a flow sensor according to an embodiment of the present invention.
Figure 1B:
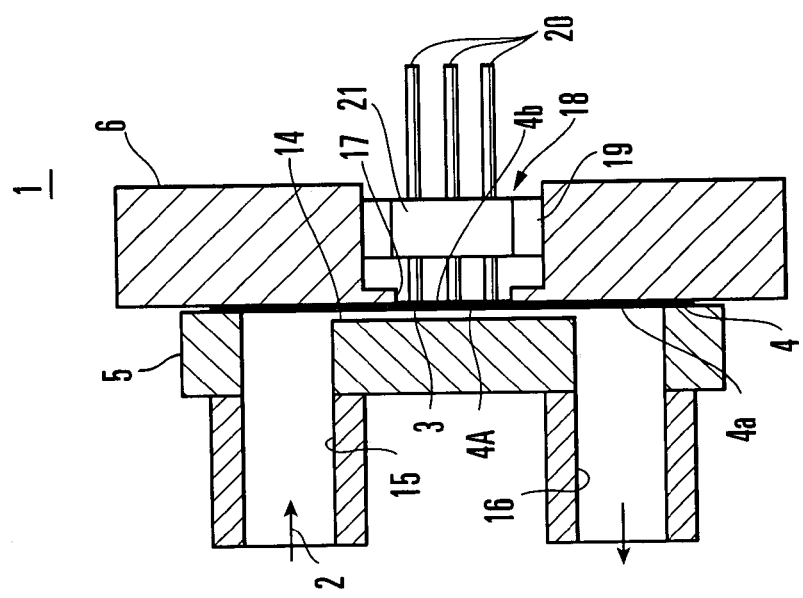
Figure 1A:
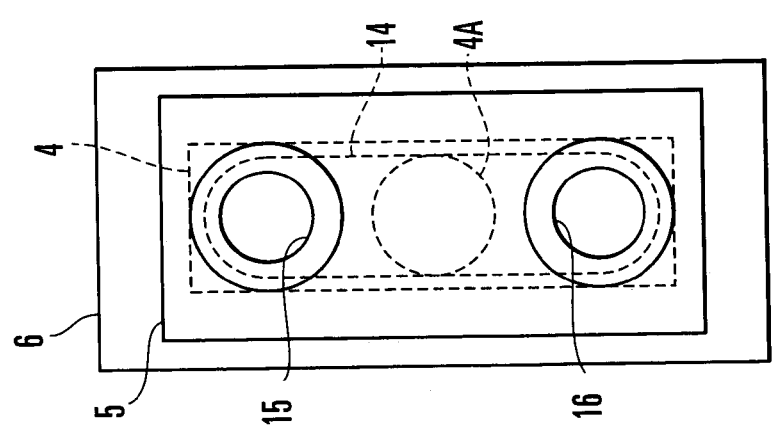
Figure 2:
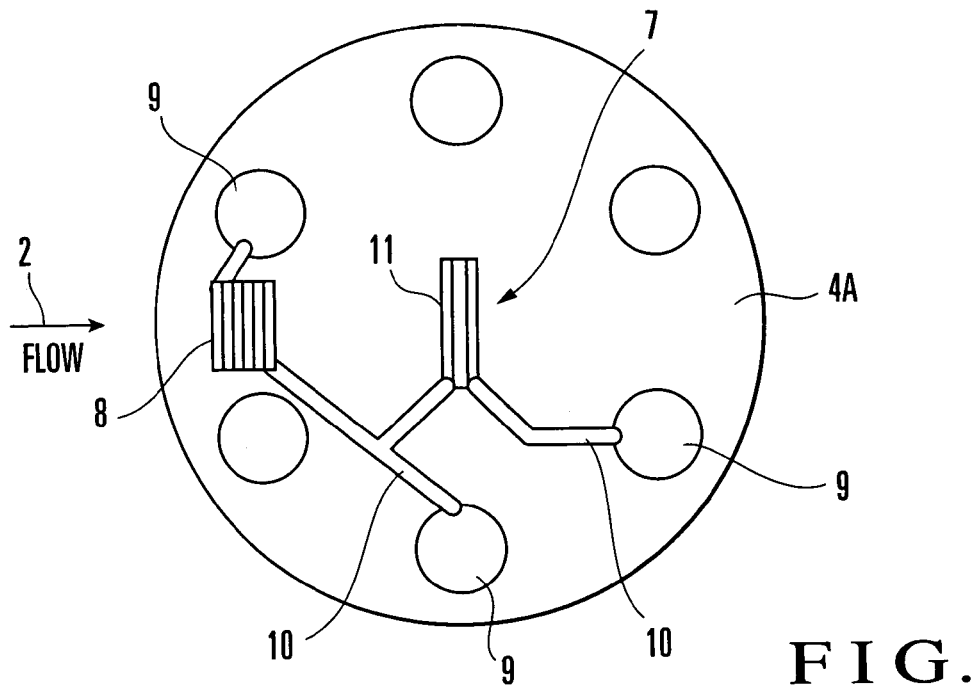
FIG. 2 is a front view of a sensor portion.

FIGS. 1A, 1B, and 1C are front, sectional, and rear views, respectively, showing a flow sensor according to an embodiment of the present invention, and FIG. 2 is a front view of a sensor portion. Referring to FIGS. 1A to 1C and FIG. 2, a flow sensor 1 is constituted by a substrate 4 having a front surface 4a side facing a channel 3 for a measurement target fluid (to be referred to as fluid hereinafter) 2, and a channel forming member 5 and a plate 6 disposed opposedly across the substrate 4. The substrate 4 and channel forming member 5 form a part of the channel 3. The channel forming member 5 and plate 6 are bonded to each other by welding or brazing, or with bolts.

The substrate 4 forms an elongated rectangular thin plate, and its peripheral portion is bonded to the rear surface of the channel forming member 5. As the material of the substrate 4, one having low thermal conductivity, high heat resistance, high corrosion resistance, and high rigidity is preferable. In this embodiment, the substrate 4 is made of thin stainless steel with a thickness of about 50 μm to 150 μm, and its central portion is separated from the plate 6 to be thermally insulated from it, thus forming a sensor portion 4A having a diaphragm structure. When the substrate 4 is made of stainless steel, if its thickness is 50 μm or less, the strength decreases, which is not preferable; if its thickness is 150 μm or more, the heat conduction efficiency in the direction of thickness of the substrate, i.e., between the fluid and the temperature detection means, decreases, and a heat transfer amount (heat loss) in a direction parallel to the surface of the substrate increases, which are not preferable.

An electrical insulating film (not shown) is formed on a rear surface 4b of the sensor portion 4A which is opposite to the passage 3 side. A temperature detection sensor (temperature detecting means) 7 for measuring the flow velocity (flow rate) of the fluid 2, an ambient temperature sensor 8, electrode pads 9, and thin metal films 10 for wiring are formed on the insulating film by a known thin-film forming technique. For example, a material such as platinum is deposited on the surface of the electrical insulating film, and is etched into a predetermined pattern, thus forming the above components. The temperature detection sensor 7 and ambient temperature sensor 8 are electrically connected to the electrode pads 9 through the thin metal films 10 for wiring.

The temperature detection sensor 7 is formed at the center of the rear surface of the sensor portion 4A. The ambient temperature sensor 8 is used to compensate for a change in the ambient temperature, i.e., the fluid temperature, and is formed close to the peripheral portion on the rear surface of the sensor portion 4A. As the electrical insulating film, for example, a thin silicon oxide ($SiO_2$) film or silicon nitride film with a thickness of about several thousand Å is used. The silicon oxide film is formed by sputtering or CVD, or by applying a solvent mixed with silicon oxide and heating it to a predetermined temperature, thus fusing and solidifying silicon oxide. The silicon nitride film is formed by sputtering or CVD. The ambient temperature sensor 8 may be formed on that portion of the substrate 4 which is other than the sensor portion 4A, or on a portion other than the substrate 4. The electrode pads 9 may also be formed on those portions of the substrate 4 which are other than the sensor portion 4A, and electrodes may be derived from them.

The temperature detection sensor 7 for measuring the flow velocity (flow rate) generally has the following three different arrangements:
I) one heat-generating body serving also as temperature sensor,
II) two heat-generating bodies serving also as temperature sensors, and
III) a heat-generating body serving also as temperature sensor, and a temperature sensor.

FIG. 2 shows an example in which a self-heating type temperature detection sensor 7 is formed of one heat-generating body 11. One ambient temperature sensor 8 is formed on the upstream side to be close to the peripheral portion on the rear surface of a sensor portion 4A.

Figure 3:
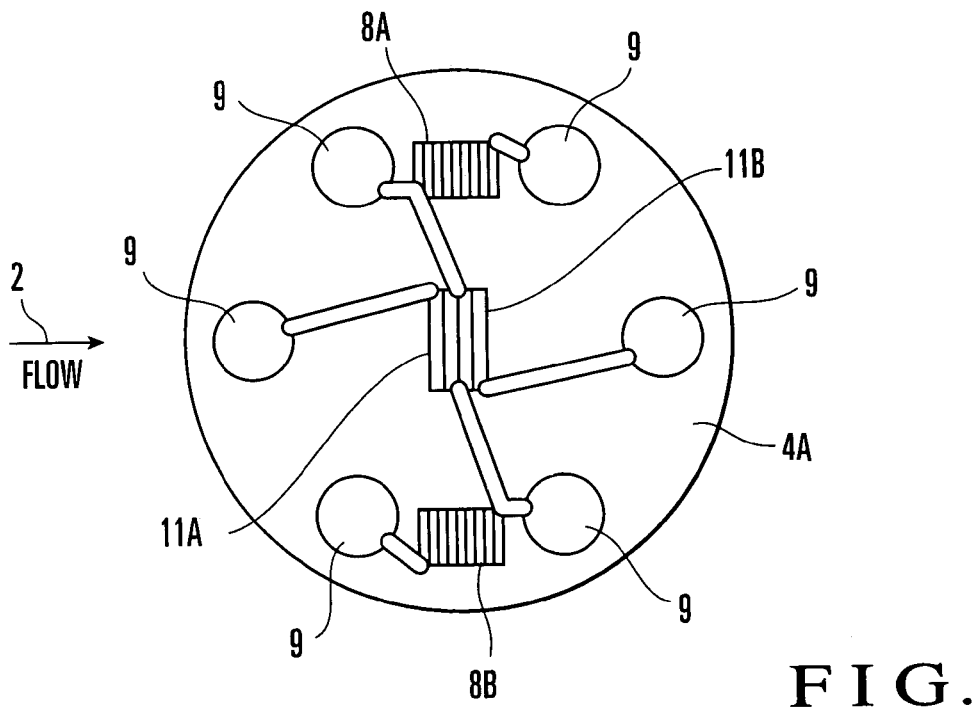
FIG. 3 is a front view showing a sensor portion according to another example.

FIG. 3 shows an example in which a self-heating type temperature detection sensor 7 is formed of two heat-generating bodies 11A and 11B. The two heat-generating bodies 11A and 11B are arrayed on the center of the rear surface of a sensor portion 4A to be close to each other in the flowing direction of a fluid 2. Two ambient temperature sensors 8A and 8B are also formed. The ambient temperature sensors 8A and 8B are formed close to the peripheral portion of the sensor portion 4A such that they oppose each other in a direction perpendicular to the flowing direction of a fluid 2.

Figure 4:
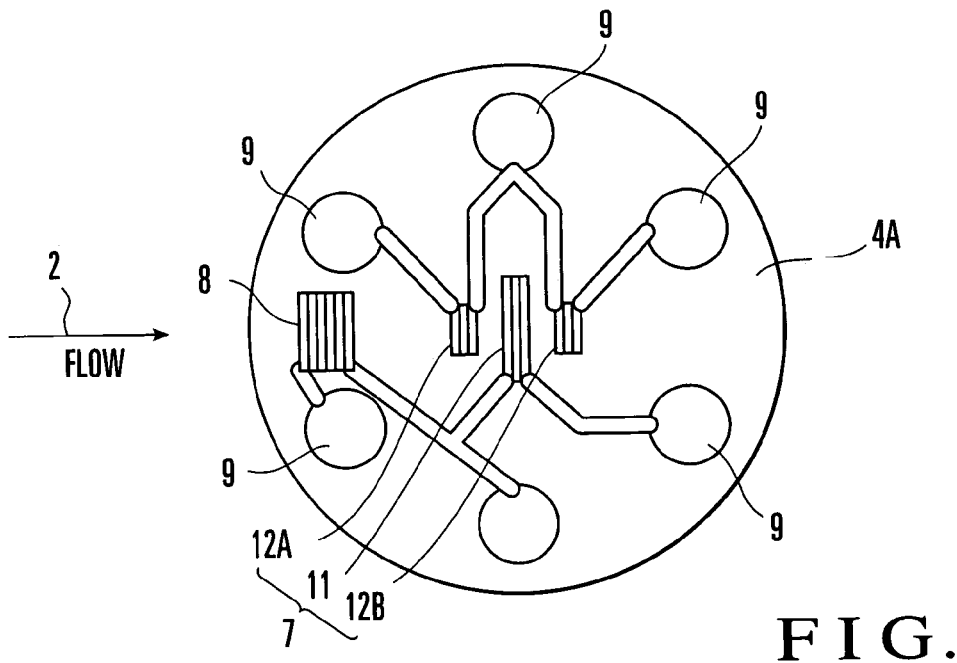
FIG. 4 is a front view showing a sensor portion according to still another example.

FIG. 4 shows an example in which an indirect heated type temperature detection sensor 7 is formed of one heat-generating body 11 and two temperature sensors 12A and 12B. The heat-generating body 11 is formed at the center of the rear surface of a sensor portion 4A. The two temperature sensors 12A and 12B are arrayed upstream and downstream of the heat-generating body 11 in the flowing direction of a fluid 2. One ambient temperature sensor 8 is formed on the peripheral portion of the rear surface of the sensor portion 4A and upstream in the flowing direction of the fluid 2. The pattern width of the heat-generating body 11 is preferably 10 μm to 50 μm, and the pattern widths of the temperature sensors 12A and 12B and ambient temperature sensor 8 are preferably about 5 μm to 10 μm.

Figure 5:
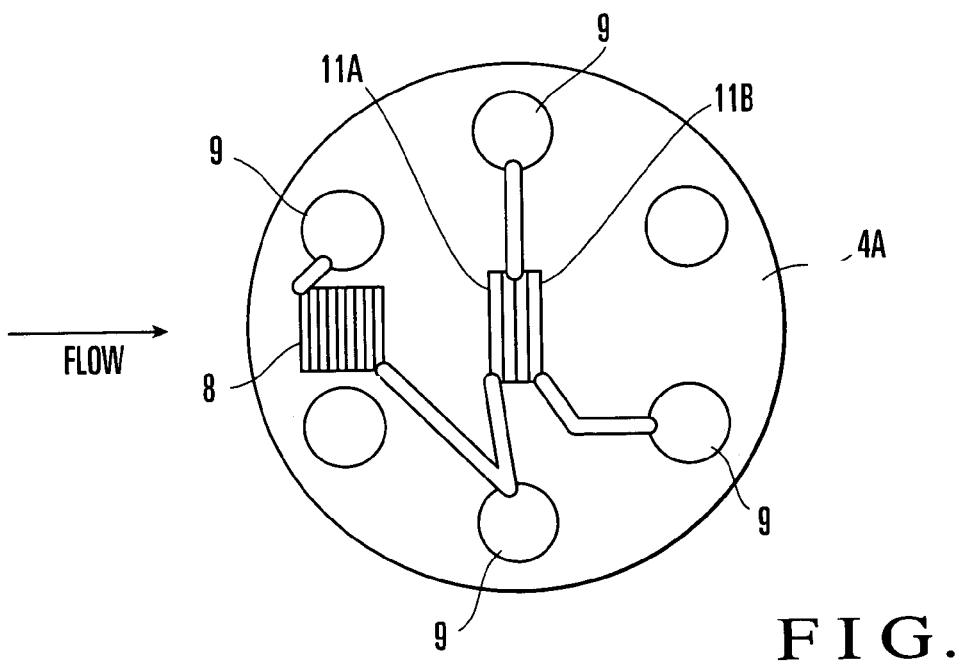
FIG. 5 is a front view showing a sensor portion according to still another example.

FIG. 5 shows an example in which a self-heating type temperature detection sensor 7 is formed of two heat-generating bodies 11A and 11B. The two heat-generating bodies 11A and 11B are arrayed at the center of the rear surface of a sensor portion 4A to be close to each other in the flowing direction, of a fluid 2. One ambient temperature sensor 8 is formed upstream in the flowing direction of the fluid 2.

Figure 6:
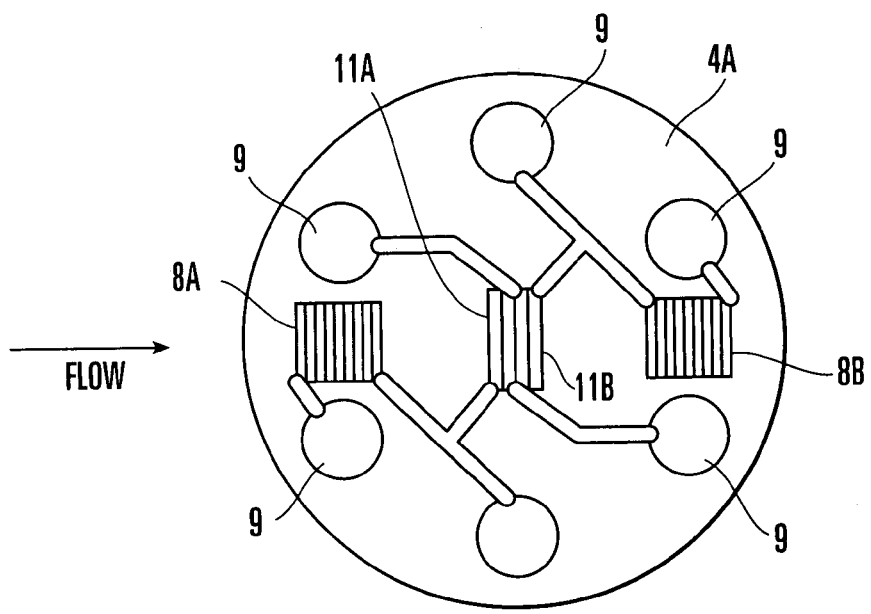
FIG. 6 is a front view showing a sensor portion according to still another example.

FIG. 6 shows an example in which two heat-generating bodies 11A and 11B are arrayed at the center of the rear surface of a sensor portion 4A to be close to each other in the flowing direction of a fluid 2, thus forming a self-heating type temperature detection sensor 7. Two ambient temperature sensors 8A and 8B are formed upstream and downstream in the flowing direction of the fluid 2 to be close to the peripheral portion on the rear surface of the sensor portion 4A.

Figure 7:
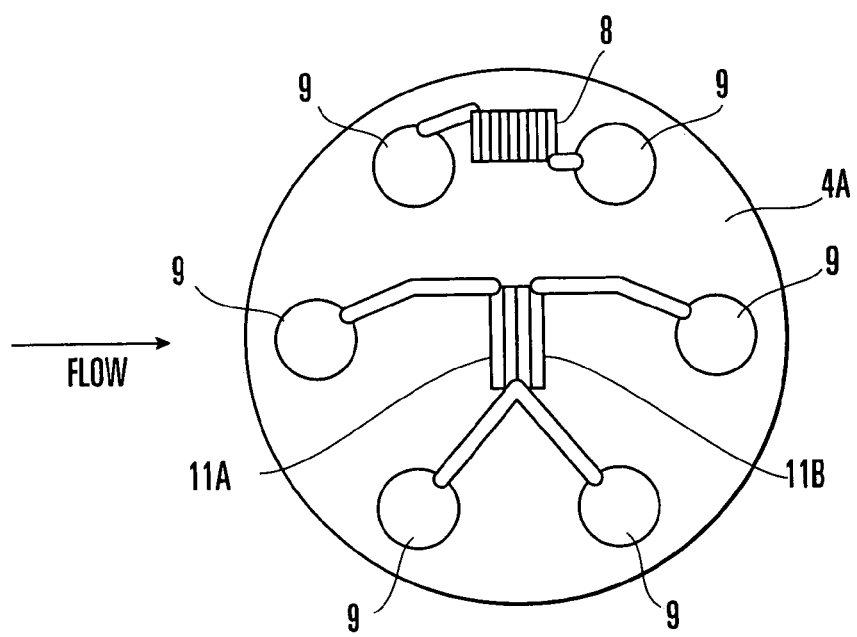
FIG. 7 is a front view showing a sensor portion according to still another example.

FIG. 7 shows an example in which two heat-generating bodies 11A and 11B are similarly arrayed at the center of the rear surface of a sensor portion 4A to be close to each other in the flowing direction of a fluid 2, thus forming a self-heating type temperature detection sensor 7. One ambient temperature sensor 8 is formed close to the peripheral portion on the rear surface of the sensor portion 4A in a direction perpendicular to the flowing direction of the fluid 2.

Referring to FIG. 1, the channel forming members 5 is formed of a narrow elongated metal plate, and has a recess 14, slightly smaller than the substrate 4 and having a depth of about 0.5 mm to several mm, at the center of its rear surface. The space defined between the recess 14 and the front surface 4a of the substrate 4 forms part of the channel 3 for the fluid 2. A fluid supply port 15 and fluid discharge port 16 communicating with the channel 3 extend in the channel forming member 5 to be close to its two ends in the longitudinal direction.

The plate 6 is formed of a narrow elongated metal plate, and is brought into tight contact with the rear surface 4b of the substrate 4 and is bonded there. A through hole 17 having substantially the same size as that of the sensor portion 4A of the substrate 4 is formed at the center of the plate 6. An electrode 18 for electrically connecting the temperature detection sensor 7 and ambient temperature sensor 8 to the outside is disposed in the through hole 17. The electrode 18 is formed by fixing a plurality of metal pins 20 to a metal frame 19 through hermetic glass 21. The inner ends of the pins 20 are bonded to the electrode pads 9 of the sensor portion 4A by brazing.

When attaching the electrode 18, it is preferable that the through hole 17 be vacuum-evacuated, or a dry inert gas having low thermal conductivity be sealed in the air-tight space between the substrate 4 and electrode 18. The electrode 18 may be open to the atmosphere as far as it is not adversely affected by surrounding wind. Alternatively, the electrode pads of the sensor and an external circuit board may be connected to each other without using the electrode 18 but by wire bonding using gold wires.

As the material of the channel forming member 5, one having high thermal conductivity, high heat resistance, high corrosion resistance, and high rigidity is preferable because it serves as the structural material and heat sink. To apply the flow sensor 1 to a corrosive fluid, that portion of the flow sensor 1 which is to come into contact with the fluid 2 is preferably, entirely made of one corrosion-resistant material. The respective members are preferably bonded to each other without using any different type of bonding material. For this reason, in this embodiment, the channel forming member 5 is formed of stainless steel (particularly SUS316L) which is the same material as that of the substrate 4. In this manner, when the substrate 4 and channel forming member 5 are formed of stainless steel, the respective members can be bonded to each other by YAG laser welding or the like without using any different metal.

Stainless steel has relatively superior workability and is thus suitable as the sensor material. The material of the channel forming member 5 is not limited to stainless steel, but another material, e.g., sapphire or a ceramic material, having high thermal conductivity can also be used if the channel forming member 5 is formed thin accordingly, because heat dissipating toward the surface can be decreased. The thermal conductivities of stainless steel, sapphire, and the ceramic material at 300 K are respectively about 16, 46, and 36 [W/mK], although they depend on their compositions.

As the material of the plate 6, one having high thermal conductivity, high heat resistance, and high rigidity is preferable because it serves as the structural material and heat sink as well. As the plate 6 does not come into contact with the fluid to be measured, corrosion resistance is not much necessary.

Figure 11:
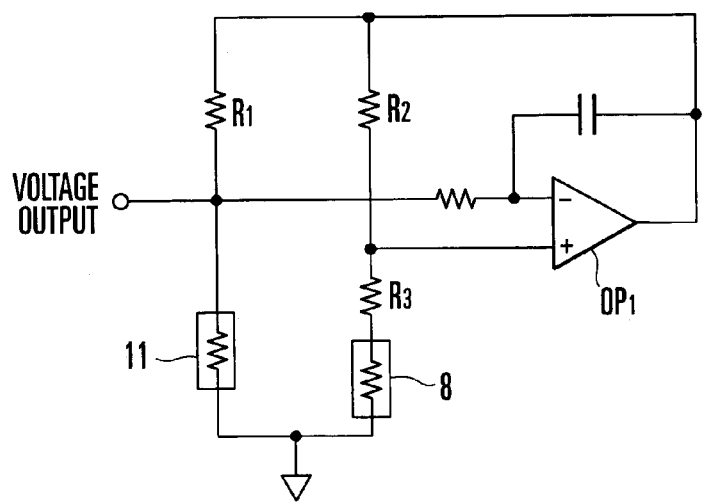
FIG. 11 is a diagram showing a constant temperature difference circuit.

In the flow sensor 1 shown in FIG. 2 which uses one heat-generating body 11, when a constant temperature difference circuit as shown in FIG. 11 is used, the flow velocity can be converted into a voltage signal.

As shown in FIG. 11, this constant temperature difference circuit has a bridge circuit formed of a series circuit of resistors R1 and R2, a heat-generating body (resistance heater) 11, a resistor R3, and an ambient temperature sensor 8, and an operational amplifier OP1 for receiving a voltage at the connecting point of the resistor R1 and heat-generating body 11 as an inverting input and a voltage at the connecting point of the resistors R2 and R3 as a non-inverting input. An output from the operational amplifier OP1 is connected to one end of each of the resistors R1 and R2 which form the bridge circuit. The resistances of the resistors R1, R2, and R3 are set such that the temperatures of the resistors R1, R2, and R3 are constantly higher than that of the ambient temperature sensor 8 by predetermined temperatures.

In this circuit configuration, when the fluid 2 flows in the direction indicated by an arrow, the heat-generating body 11 is deprived of heat by the fluid 2, and its resistance decreases, so that the equilibrium state of the bridge circuit is lost. Accordingly, a voltage corresponding to a voltage difference between the inverting and non-inverting inputs of the operational amplifier OP1 is applied from the operational amplifier OP1 to the bridge circuit, so that the heat generating amount of the heat-generating body 11 is increased to compensate for the heat deprived of by the fluid 2. Consequently, the resistance of the heat-generating body 11 increases, and the bridge circuit is restored to the equilibrium state. Therefore, a voltage corresponding to the flow velocity is applied to the bridge circuit which is in the equilibrium state. The constant temperature difference circuit of FIG. 11 outputs, of the voltages applied to the bridge circuit at this time, a voltage across the heat-generating body 11 as a voltage output.

In this manner, the constant temperature difference circuit controls the current or voltage such that the temperature of the heat-generating body 11 is higher than the ambient temperature measured by the ambient temperature sensor 8 by a constant temperature. The temperature difference is thus maintained at a constant value. A change in voltage, current, or power is detected, so that the flow velocity or flow rate of the fluid 2 can be measured.

Figure 13:
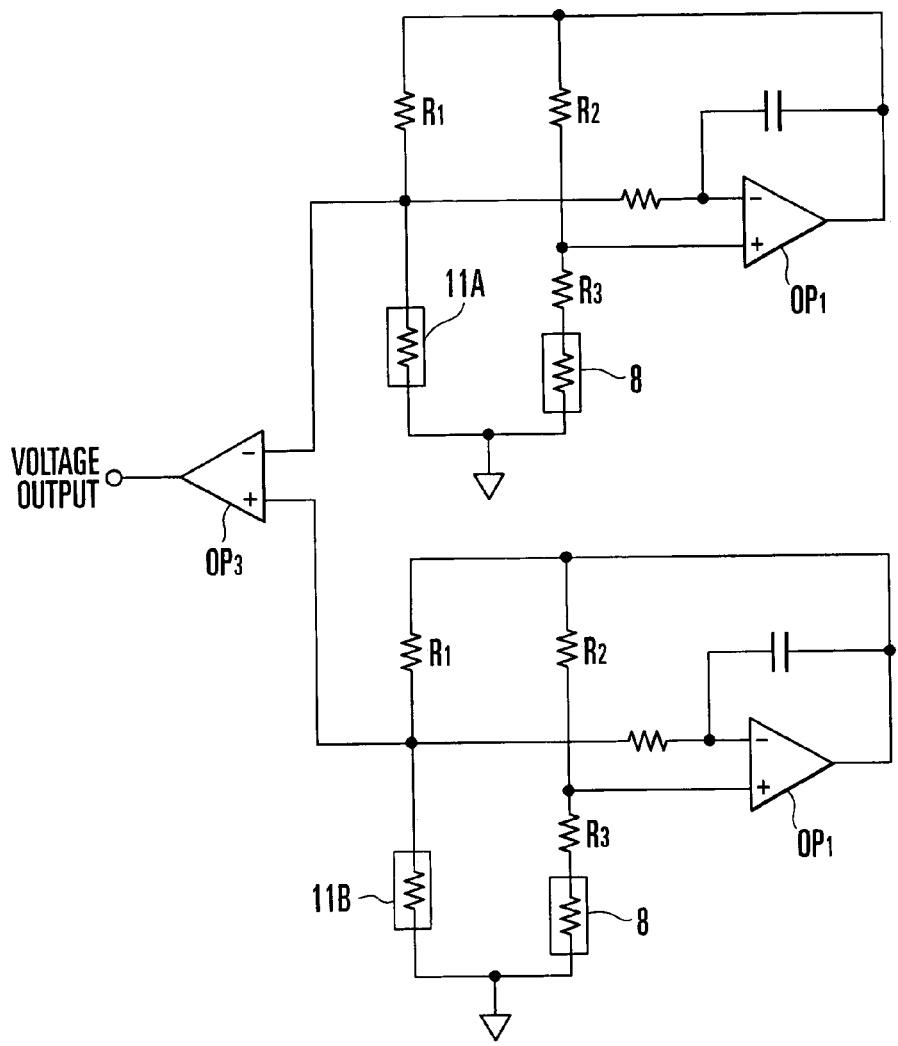
FIG. 13 is a diagram showing still another constant temperature difference circuit.

In FIGS. 3 and 6, two flow sensors each shown in FIG. 2 are combined. In this arrangement, the voltage difference between the upstream heat-generating body 11A and downstream heat-generating body 11B is detected by the circuit shown in FIG. 13, so that the flow velocity or flow rate and the flowing direction of the fluid 2 can be measured. In the circuit shown in FIG. 13, two constant temperature difference circuits each shown in FIG. 11 are used, and the difference between the voltages across heat-generating bodies 11A and 11B is amplified by an operational amplifier OP3, thus obtaining a voltage output. The flow velocity can be obtained from the magnitude of the voltage output, and the direction can be obtained from the polarity of the voltage output. Although a difference in voltage is detected, a difference in current or power may be detected instead.

Figure 12:
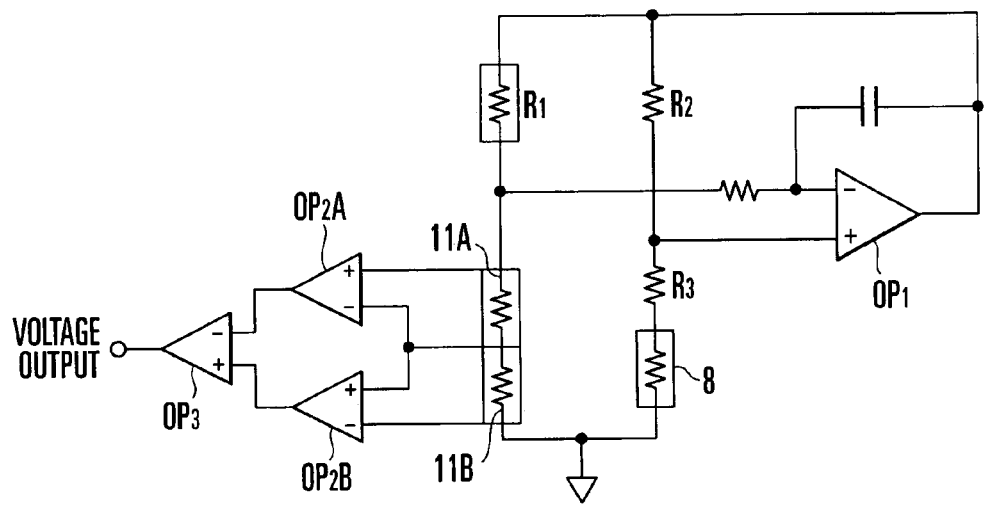
FIG. 12 is a diagram showing another constant temperature difference circuit.

The flow sensor shown in each of FIGS. 5 and 7, which uses the two heat-generating bodies 11A and 11B, can detect the flow velocity and flowing direction of the fluid by using the constant temperature difference circuit shown in FIG. 12. The circuit shown in FIG. 12 is similar to the constant temperature difference circuit shown in FIG. 11 in that it includes a bridge circuit formed of resistors R1 and R2, heat-generating bodies (resistance heaters) 11A and 11B, a resistor R3, and an ambient temperature sensor 8, and an operational amplifier OP1 for keeping the bridge circuit at the equilibrium sate. The circuit shown in FIG. 12 has operational amplifiers OP2A and OP2B for respectively amplifying the voltages across the two heat-generating bodies 11A and 11B connected in series, and an operational amplifier OP3 for receiving the difference between the outputs from the operational amplifiers OP2A and OP2B. An output from the operational amplifier OP3 forms a voltage output corresponding to the flow velocity of the fluid 2.

Power is supplied to the bridge circuit of the constant temperature difference circuit shown in FIG. 12, so that the two heat-generating bodies 11A and 11B form one heat-generating body. In this state, when the fluid 2 heated to a constant temperature higher than the ambient temperature flows in the direction of an arrow, the heat-generating body 11A located upstream is cooled and its temperature drops. The temperature of the heat-generating body 11B located downstream increases due to heat conduction from the upstream heat-generating body 11A through the flow of the fluid 2 as the medium. Accordingly, a temperature difference occurs between the two heat-generating bodies 11A and 11B. This temperature difference is detected in the form of changes in resistances of the heat-generating bodies 11A and 11B. Changes in resistances or in voltages across the heat-generating bodies are detected to form a sensor output, so that the flow velocity or flow rate of the fluid 2 is measured.

In this case, when the temperature difference is detected by using the two heat-generating bodies 11A and 11B, the reproducibility and precision can be improved more than in a case wherein one heat-generating body is used. Also, the flowing direction of the fluid 2 can be detected from changes in resistances of the heat-generating bodies 11A and 11B.

In the flow sensor shown in FIG. 4 which uses one heat-generating body 11 and the two temperature sensors 12A and 12B, power is supplied to the bridge circuit of the constant temperature difference circuit as shown in FIG. 11, so that the heat-generating body 11 is heated to a constant temperature higher than the ambient temperature. In this state, when the fluid 2 flows in the direction of an arrow, a temperature difference occurs between the temperature sensors 12A and 12B upstream and downstream, respectively, of the heat-generating body 11. The voltage difference or resistance differences are detected by the circuit shown in FIG. 14 or 15, thus measuring the flow velocity or flow rate of the fluid 2.

Figure 14:
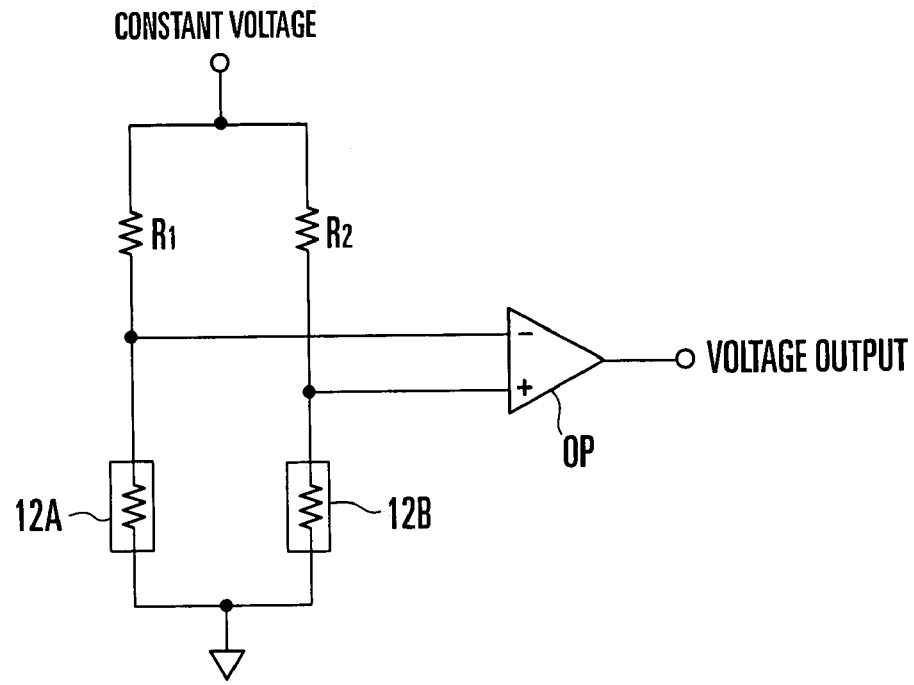
FIG. 14 is a diagram showing a sensor output circuit.
Figure 15:
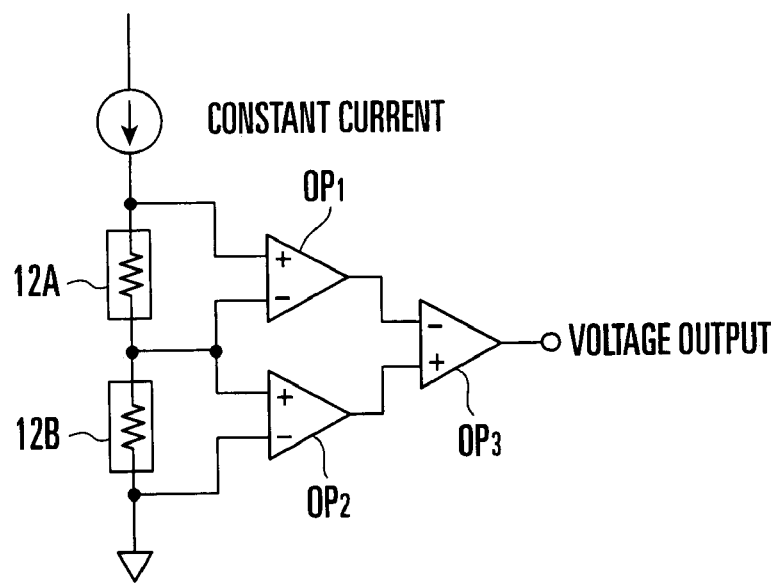
FIG. 15 is a diagram showing another sensor output circuit.

The circuit shown in FIG. 14 supplies a voltage output by using a bridge circuit including two temperature sensors 12A and 12B. In the circuit shown in FIG. 15, the voltages across two temperature sensors 12A and 12B connected in series are amplified by operational amplifiers OP1 and OP2, respectively, and a difference between the two amplified voltages is amplified by an operational amplifier OP3, thus forming a voltage output. In this case, the flowing direction of the fluid 2 can be detected because the two temperature sensors 12A and 12B are used. This arrangement has the highest precision and the best reproducibility.

In this flow sensor 1, the temperature detection sensor 7 is formed on that surface of the thin plate-like substrate 4 which is opposite to a surface that the fluid 2 comes into contact with. Thus, the temperature detection sensor 7, ambient temperature sensor 8, electrode pads 9, or the like will not come into direct contact with the fluid 2 to be corroded or deteriorated, or dust or the like will not come into contact with them. As a result, this flow sensor 1 can be used for measuring a corrosive gas or liquid used in a semiconductor manufacturing apparatus or the like, and the reliability and durability of the sensor can be improved.

Since the substrate 4 is formed of stainless steel having low thermal conductivity into a thin plate, heat conduction in a direction parallel to the surface of the substrate 4 is small, while heat conduction in the direction of thickness of the substrate, i.e., between the fluid 2 and temperature detection sensor 7, is good, thus improving the response characteristics. Stainless steel has high heat resistance, high corrosion resistance, high workability, and high rigidity, and is accordingly suitable as the sensor material.

Figure 8C:
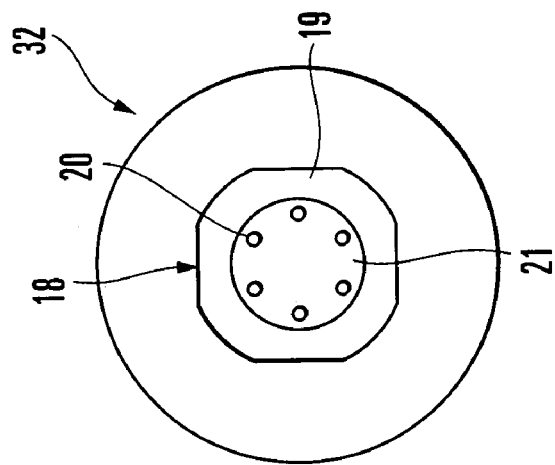
FIGS. 8A, 8B, and 8C are front, sectional, and rear views, respectively, showing another embodiment of the present invention.
Figure 8B:
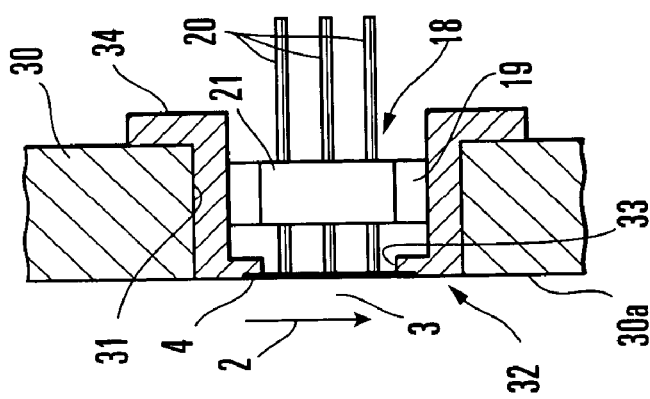
Figure 8A:
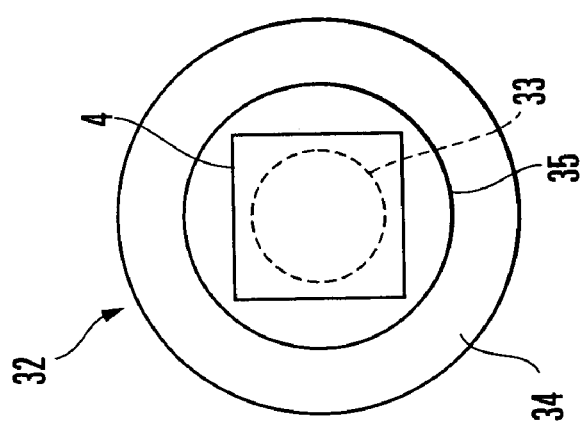

FIGS. 8A, 8B, and 8C are front, sectional, and rear views, respectively, showing another embodiment of the present invention. The same constituent members as those shown in FIGS. 1 and 2 are denoted by the same reference numerals, and a description thereof will be omitted when necessary. In this embodiment, a sensor attaching hole 31 is formed in a channel forming member 30 which forms a channel 3 for a fluid 2, and a flow sensor 32 is attached in the sensor attaching hole 31. The channel forming member 30 is made of stainless steel. The flow sensor 32 is formed of a cup-like package 35 and a substrate 4. The package 35 has a circular opening 33 at the center of its front surface, and an open rear surface. A flange 34 is integrally formed on the rear end of the outer surface of the package 35. The peripheral portion of the substrate 4 is bonded to the front surface of the package 35, so the substrate 4 covers the opening 33. The substrate 4 is formed of stainless steel into a thin plate. A temperature detection sensor 7, an ambient temperature sensor 8, electrode pads 9, and thin metal films 10 for wiring shown in FIG. 4 are formed at the center of the rear surface of the substrate 4 through an electrical insulating film.

The substrate 4 is not limited to a square one but can have another shape such as a circle. The arrangement of the temperature detection sensor 7 and ambient temperature sensor 8 is not limited to the one shown in FIG. 4, but can be the one shown in FIGS. 2, 3, 5, 6, or 7. The ambient temperature sensor 8 can be formed at a portion other than the substrate 4.

The package 35 is made of stainless steel and is fitted in the sensor attaching hole 31 of the channel forming member 30, and its flange 34 is bonded to the rear surface of the channel forming member 30 by YAG laser welding or the like. The front surface of the package 35 and the surface of the substrate 4 are flush with an inner wall surface 30a of the channel forming member 30 to constitute part of the channel 3. An electrode 18 is incorporated in the package 35 from the opening in the rear surface of the package 35, and pins 20 are connected to the electrode pads 9 by brazing. The electrode pads of the sensor may be connected to the circuit board by wire bonding using gold wires.

In the flow sensor 32 with the above structure, the sensor attaching hole 31 is formed in the channel forming member 30, and the flow sensor 32 is fitted in the sensor attaching hole 31 so that the surface of the substrate 4 comes into contact with the fluid 2. As the package 35 need only be bonded to the channel forming member 30, it can be attached easily without using any special units, components, or the like. When bonding the flange 34 and channel forming member 30 to each other, they may be fixed with bolts by using a seal member such as an O-ring.

Figure 9:
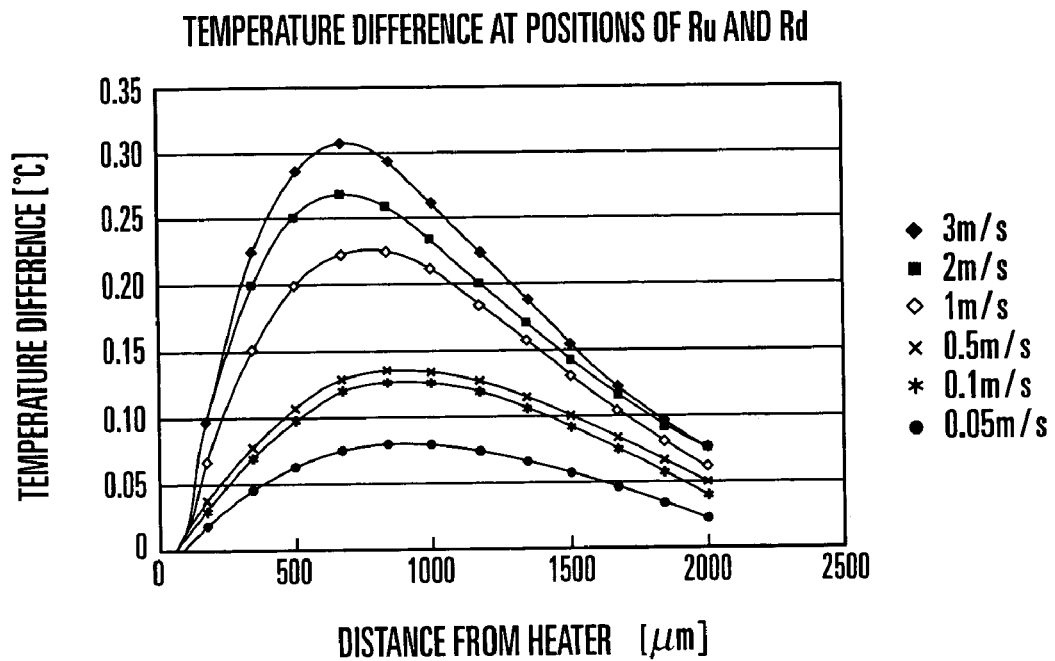
FIG. 9 is a graph showing a relationship between a distance of the upstream or downstream temperature sensor from a heat-generating body and a temperature difference between the two temperature sensors when the distance of each of the two temperature sensors is changed.
Figure 10:
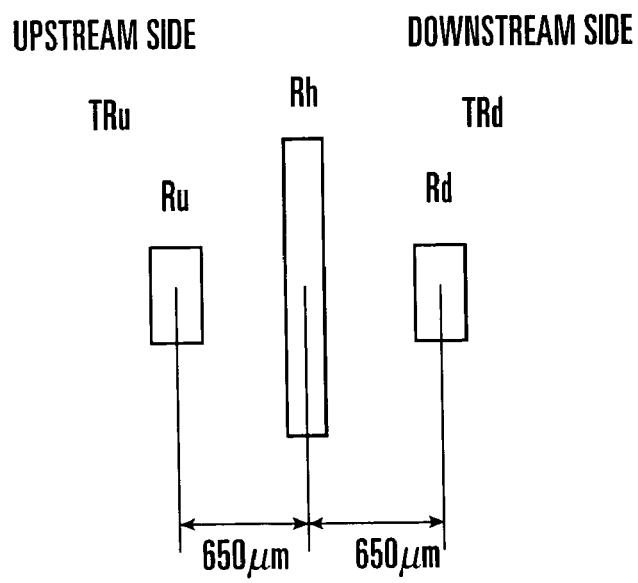
FIG. 10 is a graph showing the distances from a heater (Rh) to the temperature sensors (Ru, Rd)

With the structure of the sensor portion 4A shown in FIG. 4, simulation was performed by setting the temperature of the heat-generating body 11 to be higher than the ambient temperature by 30° C. in the air, and by changing the distance of the upstream or downstream temperature sensor 12A or 12B from the heat-generating body 11. FIG. 9 shows a relationship between this distance and a temperature difference between the two temperature sensors 12A and 12B. FIG. 10 shows a distance from a heater Rh (heat-generating body) to the temperature sensor (Ru, Rd). As is apparent from FIG. 9, the positions where the temperature difference became the largest under these conditions were those at 650 μm from the center of the heat-generating body 11.

As described above, according to the present invention, the temperature detecting means including the heat-generating body is formed on that surface of a thin plate-like substrate that forms part of the channel, which is opposite to the channel. The fluid thus does not come into direct contact with the temperature detecting means, electrode pads, thin metal films for wiring, or the like. A sensor that can cope with measurement of a liquid or corrosive gas by appropriately selecting the material of the substrate and has high reliability and highly durability can thus be provided.

As the material of the substrate, stainless steel, sapphire, a ceramic material, or the like can be used. Of these materials, stainless steel is very suitable in terms of corrosion resistance, workability, thermal conductivity, and rigidity. If corrosion resistance must be particularly high, sapphire is suitable.

The thickness of the substrate is preferably as small as possible in order to improve heat conduction between the fluid and temperature detecting means and to decrease heat conduction in the substrate in the transverse direction. The conditions must be determined by considering external factors in fabrication such as workability, strength, handling, and the like. For this reason, when the substrate is made of stainless steel, its optimal thickness is about 50 µm to 150 µm.

According to the present invention, since part of the channel can be formed as a flow sensor, the flow rate can be measured by only incorporating the sensor in the channel. Thus, the thin plate-like substrate can be bonded stably to improve the reliability. As the channel can be formed small with high precision in accordance with the measurement range and the like, a high-precision or low-flow-rate sensor can be realized.

According to the present invention, an opening is formed in that front surface of the package to be attached in the sensor attaching hole formed in the channel forming member for forming a fluid channel, which opposes the interior of the channel and which is to come into contact with the fluid. The opening is covered with the thin plate-like substrate, and the temperature detecting means including the heat-generating body is formed on that surface of the substrate which is opposite to the channel. Hence, the sensor can be easily attached to the channel forming member without requiring any special units or components.

The invention claimed is:

1. A flow sensor comprising:
  a thin plate-like substrate which forms part of a channel for a fluid,
  a temperature detecting sensor formed on a surface of said substrate including a heat-generating body, said surface is disposed outside of said channel wherein said temperature detecting sensor is directly formed on the surface of said substrate,
  an ambient temperature sensor to measure ambient temperature, and
  a temperature difference circuit coupled to the temperature detecting sensor and the ambient temperature sensor, the temperature difference circuit operates to hold temperature difference between temperature sensed at the temperature detecting sensor and temperature sensed at the ambient temperature sensor constant,
  wherein the heat generating body is heated to a constant temperature that is higher than the ambient temperature.

2. The flow sensor according to claim 1, wherein said substrate and a channel forming member are made of any one member selected from stainless steel, sapphire, and a ceramic material.

3. The flow sensor according to claim 1, wherein said substrate is made of stainless steel having a thickness of 50 µm to 150 µm.

4. A flow sensor comprising:
  a flow channel forming member which forms a channel for a fluid and has an opening midway along the channel, a thin plate-like substrate for closing the opening of said channel forming member,
  a temperature detecting sensor formed on a surface of said substrate which is disposed outside of the channel and including a heat-generating body,
  an ambient temperature detecting sensor to measure ambient temperature, and
  a temperature difference circuit to hold temperature difference between the temperature measured at the temperature detecting sensor and the temperature measured at the ambient temperature detecting sensor constant,
  wherein said temperature detecting sensor is directly formed on the surface of said substrate, and temperature of the heat-generating body is held higher than the ambient temperature.

5. The flow sensor according to claim 4, wherein said substrate and said channel forming member are made of any one member selected fom stainless steel, sapphire, and a ceramic material.

6. The flow sensor according to claim 4, wherein said substrate is made of stainless steel having a thickness of 50 µm to 150 µm.

7. A flow comprising:
  a package to be attached in a sensor attaching hole formed in a channel forming member which forms a channel for a fluid,
  an opening is formed in a front surface of said package which opposes an interior of the channel and is to come into contact with the fluid, the opening is covered with a thin plate-like substrate,
  a temperature detecting sensor including a heat-generating body is directly formed on a surface of said substrate which is opposite to the channel,
  an ambient temperature detecting sensor to measure ambient temperature, and
  a temperature difference circuit to hold the temperature difference between the temperature measured at the temperature detecting sensor and the temperature measured at the ambient temperature detecting sensor constant,
  wherein temperature of the heat-generating body is held higher than the ambient temperature.

8. The flow sensor according to claim 7, wherein said substrate and said channel forming member are made of any one member selected from stainless steel, sapphire, and a ceramic material.

9. The flow sensor according to claim 7, wherein said substrate is made of stainless steel having a thickness of 50 µm to 150 µm.

* * * * *